O. J. WILLHELM.
DEVICE FOR DISTRIBUTING PULVERULENT SUBSTANCES.
APPLICATION FILED JULY 31, 1916.

1,287,809.

Patented Dec. 17, 1918.
2 SHEETS—SHEET 1.

Inventor:
Oscar J. Willhelm
by
Edward S. Mitchell,
Atty

O. J. WILLHELM.
DEVICE FOR DISTRIBUTING PULVERULENT SUBSTANCES.
APPLICATION FILED JULY 31, 1916.

1,287,809.

Patented Dec. 17, 1918.
2 SHEETS—SHEET 2.

INVENTOR.
Oscar J. Willhelm
BY Edward D. Mitchell
ATTORNEY

UNITED STATES PATENT OFFICE.

OSCAR J. WILLHELM, OF BROOKLYN, NEW YORK.

DEVICE FOR DISTRIBUTING PULVERULENT SUBSTANCES.

1,287,809.

Specification of Letters Patent.

Patented Dec. 17, 1918.

Application filed July 31, 1916. Serial No. 112,211.

*To all whom it may concern:*

Be it known that I, OSCAR J. WILLHELM, a citizen of the United States, and resident of Brooklyn, in the county of Queens and State of New York, have invented certain new and useful Improvements in Devices for Distributing Pulverulent Substances, of which the following is a specification.

My invention relates to an apparatus for distributing powdered substances, and has more especial reference to a portable insecticide distributer.

One object of the invention is to provide a device by means of which insecticide may be sprayed in regulated quantities upon plants and the like. A further object of the invention is to so improve the detail structure of a device of this character that the latter shall be simple and efficient in operation, and capable of production at a relatively low cost.

The preferred form of the invention is illustratively exemplified in the accompanying drawing, in which Figure 1 is a top plan view, parts being broken away;

Figure 1:
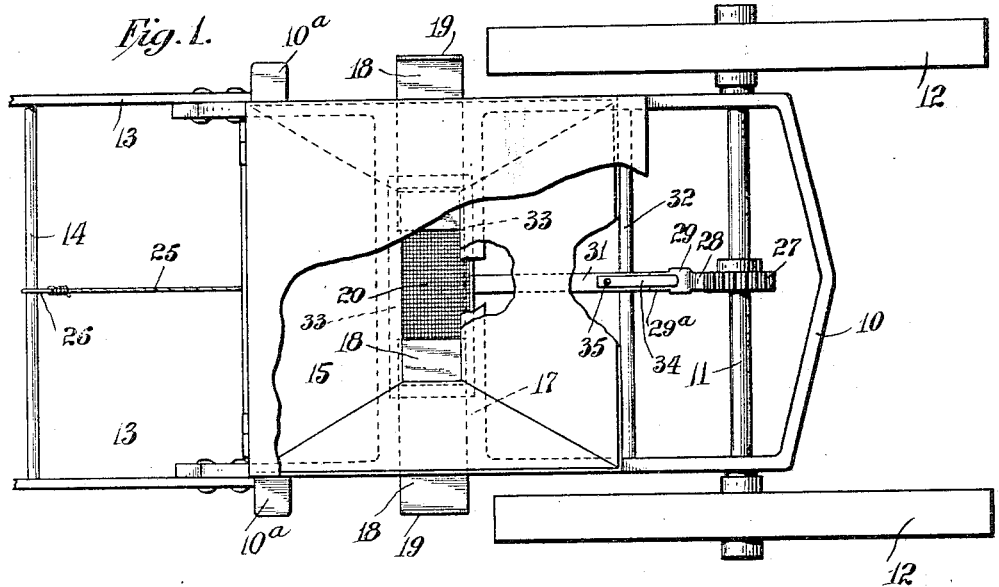

Referring to the drawings, 10 denotes a frame which is substantially rectangular in general contour, and is provided with the legs 10ª which act as a support when the device is at rest. Traversing the side members of the frame, near its forward end, is a shaft 11 upon which traction wheels 12 are mounted. The rear end of the frame is provided with extension bars 13 forming a bearing for the handle bar 14.

Supported by the frame 10 at approximately its median portion is a hopper 15 adapted to receive the pulverulent insecticide 16. For the purpose of initially regulating the quantity of insecticide which may be discharged from the hopper 15, during the spraying operation, I form the hopper with its lower end open and mount thereunder slidably in undercut grooves 17 of the side members of the frame 10, gates 18 having the upturned finger pieces 19, by which the gates may be moved toward or from each other to adjust the size of the opening at the discharge end of the hopper 15.

For the purpose of having the insecticide flow upon the plants in spray or distributed form, I support below the discharge end of the hopper and below the gates 18 a foraminous member 20, which is preferably in the form of a screen supported from the side bars of the frame 10 by means of the bolts 21.

Figure 4:
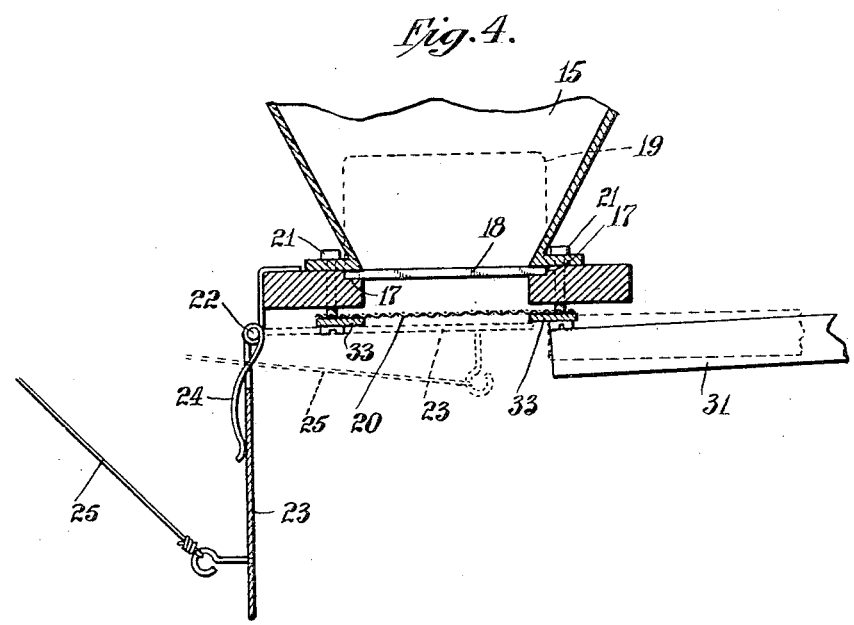
Fig. 4 is a detail vertical sectional view of a portion of the hopper and appurtenant parts.

To control the outflow of insecticide past the screen 20, I mount upon the pivot 22 a gate 23, which, by means of a spring 24, is normally pressed or forced into a position over the screen 20 so that the discharge of insecticide past the screen 20 is prevented. The gate is connected by means of a cord 25 to a hook 26 engaging the handle bar 14 and by means of which hook the gate 23 may be drawn away from the screen 20 to permit the outflow of insecticide. In Fig. 4 the closed position of the gate 23 is indicated in dotted lines while the open position is indicated in full section lines.

Figure 3:
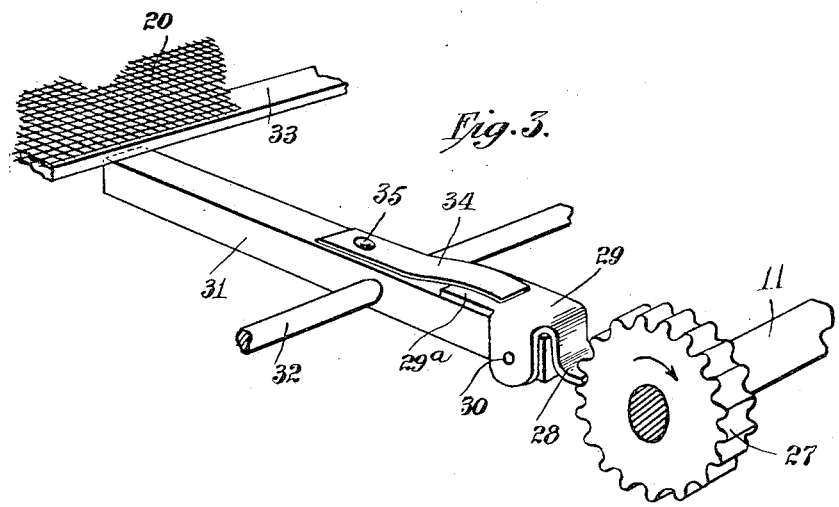
Fig. 3 is a detail perspective view of means for agitating the insecticide.

To prevent the screen 20 from becoming clogged with insecticide, and also to provide for a ready and equal distribution of the latter, I provide a suitable agitating device which is illustrated in detail in Fig. 3 of the drawing. This agitating device is adapted to act on the screen and to impart taps or blows thereto at regular intervals as the device is moved along the ground over the plants upon which the insecticide is to be sprayed.

Mounted upon the shaft 11 is a cog wheel 27, the teeth of which are engaged by the nose 28 of a clip, 29 pivoted at 30 to the front end of a tapper bar 31. The tapper bar 31 is mounted on a transverse bar 32 which is pivoted parallel to the shaft 11 in the side members of the frame 10. The rear end of the bar 31 extends into engagement with one of the plates 33 through which the bolts 21 extend and which plates 33 support and have stretched between them the screen 20. The clip 29 is provided with a rearwardly projecting extension 29ª lying under a spring plate 34 which is secured at 35 to the upper face of the tapper bar 31. The construction is such that when the cog wheel 27 rotates in the direction of the arrow (Fig. 3) it will cause the rear end of the bar 31 to tap, at regular intervals, against the plate 33 to which the screen 20 is secured. If the cog wheel 27 rotates in a reverse direction it will simply act against the clip 29 in a manner to flex the spring 34 without causing any movement of the bar. It will be noted, therefore, it is only during forward movement of the device as a whole and proper rotation of the cog wheel 27 that the screen 20 will be agitated and caused to discharge insecticide.

Figure 2:
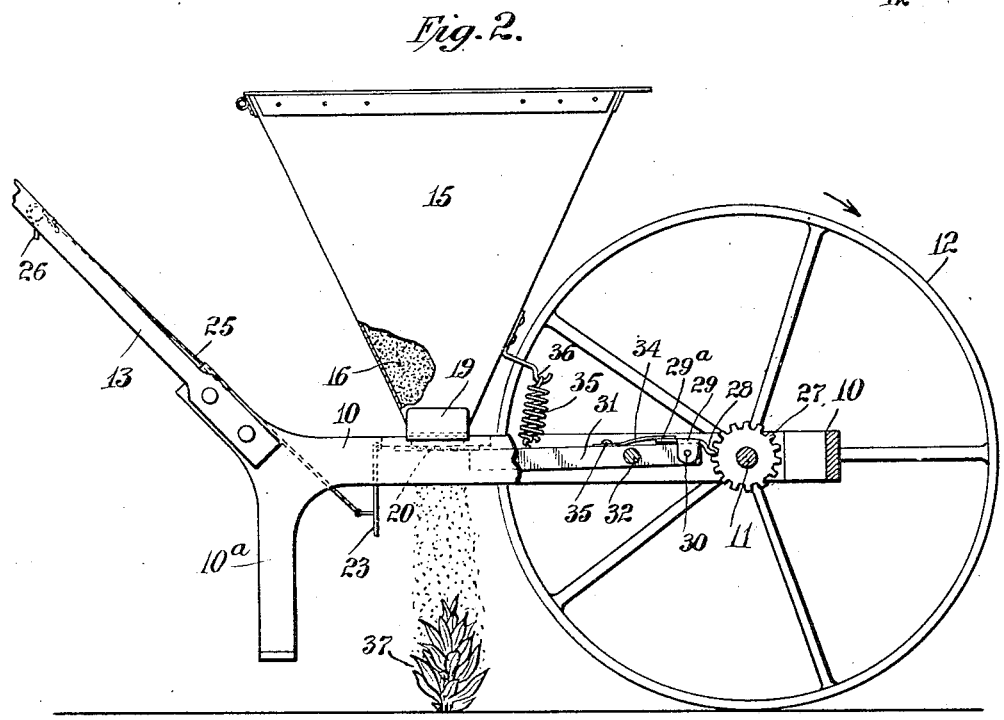
Fig. 2 is a side elevational view, with parts broken away.

As indicated in Fig. 2 the bar 31 is preferably connected by means of a coiled spring 35 to a hook 36 secured to the side of the hopper 15. The spring 35 has a normal tendency to hold the bar 31 up against the lower face of one of the plates 33.

The operation of the device has, to some extent, been indicated in the foregoing description, and the following will make the entire operation clear.

The operator grasps the handle 14 and moves the device forward in the direction indicated by the arrow in Fig. 2. When he desires to spray the plant 37, he moves the hook 26 about the bar 14 so that the gate 23 is drawn downwardly and uncovers the screen 20. As the entire device moves forward the cog wheel 27 will act upon the clip 29 and the bar 31, thus causing regular agitation of the screen 20 and an equal discharge and distribution of the insecticide 16. To cut off the flow of insecticide the hook 26 is released whereupon the spring 24 will force the gate 23 into a position to cover the screen 20 and prevent discharge of further insecticide. The quantity of insecticide to issue from the discharge end of the hopper is regulated by moving the sliding gates 18 nearer to or farther from each other, such movement causing the initial regulation for discharge from the hopper.

What I claim is:—

1. In a device of the character specified, the combination with an open frame, of a hopper supported transversely thereon, a pair of vertically slidable plates loosely suspended from said frame in a plane below the discharge end of the hopper, a foraminous body held by said plates, a tapper bar pivotally supported by the frame and having one end extending into engagement with one of said plates, and means for periodically rocking said bar about its pivot to vertically reciprocate the plate it engages and agitate said foraminous body.

2. In a device of the character specified, the combination with an open frame, of a hopper supported transversely thereon with its discharge end directed downwardly, bolts securing the hopper to the frame and having portions thereof extending below said frame, plates slidable on said portions of the bolts, a foraminous body held by said plates, a tapper bar pivotally supported by the frame and having one end extending into engagement with one of the plates, and means for periodically rocking said bar about its pivot to vertically reciprocate the plate it engages and agitate said foraminous body.

3. In a device of the character specified, the combination of a frame, a hopper supported thereon, a shaft rotatably mounted in said frame, a screen below the discharge end of said hopper, a tapper bar pivoted in said frame and having one of its ends adapted to engage said screen, a clip pivoted to the opposite end of said tapper bar and having a projection extending beyond said end of the tapper bar, said clip also having a rearward projection, a cog wheel on said rotatable shaft with the teeth of which wheel the forward projection of said clip is adapted to engage, a spring plate on said tapper bar overlying the rearward projection of said clip, and flexible means for normally holding said tapper bar in engagement with said screen.

Signed at New York city, in the county of New York, and State of New York, this 10th day of July A. D. 1916.

OSCAR J. WILLHELM.

Witnesses:
E. S. MITCHELL,
PAUL H. FRANKE.